UNITED STATES PATENT OFFICE.

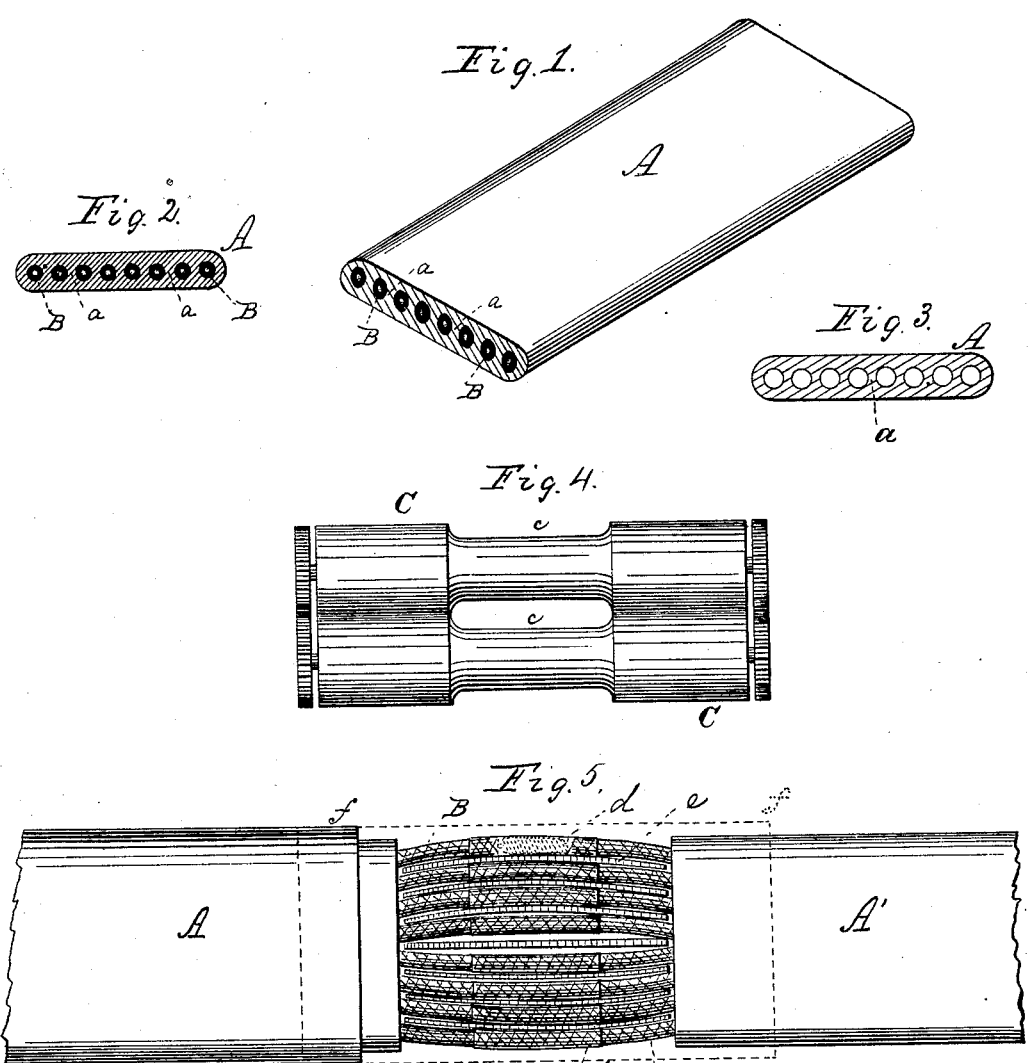

PATRICK B. DELANY, OF NEW YORK, N. Y.

ELECTRIC CABLE.

SPECIFICATION forming part of Letters Patent No. 247,460, dated September 20, 1881.

Application filed July 16, 1881. (No model.)

*To all whom it may concern:*

Be it known that I, PATRICK B. DELANY, a citizen of the United States of America, residing at New York, in the county of New York and State of New York, have invented certain new and useful Improvements in Electric Cables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement upon the electric cable which forms the subject of Letters Patent No. 242,894, granted to me June 14, 1881, its object being to obviate the necessity for so great a compression of the inclosing lead pipe as is required in the manufacture of said cable in order that the conducting-wires may be thoroughly separated from each other by complete intervening walls of lead.

It consists in an electric cable composed of a series of insulated conducting-wires arranged in practically the same plane in a flat lead pipe, and separated by complete walls of lead projecting from, extending between, and integral with the opposite walls of said pipe. The pipe I cast with its separating-walls projecting from its opposite inner surfaces, or nearly so, and only so much compression of the cable is desirable after the introduction of the wires to so snugly close the lead around the wires that no room will be left within the pipe for air.

In the accompanying drawings, Figure 1 is a perspective view of a piece of cable constructed according to my improvement. Fig. 2 is a cross-section of the same. Fig. 3 is a cross-section of a pipe for receiving the conducting-wires. Fig. 4 is a view of a pair of rollers for compressing the cable after the wires are introduced into the pipe. Fig. 5 illustrates a mode of splicing sections of the cable.

Referring to Fig. 1, the inclosing-pipe A and its partition-walls *a* are molded in one piece by means of a pipe-press, the die of which has an interior configuration similar to the shape of the pipe, and a series of separate mandrels are used to form the separate chamber and dividing-walls, in a manner which will be obvious to persons experienced in the manufacture of lead pipe.

In one mode of making my cable the pipe is first prepared in sections of convenient length, and the wires, covered with cotton, kerite, or other suitable insulating material, are then introduced by first blowing or otherwise passing through each chamber of the cable a small cord or wire of proper length, and then by means of this cord or wire drawing the conducting-wire into its chamber. The conducting-wire should fit at first quite loosely, in order that it may be readily drawn to its place, and when all the wires have been introduced the cable is passed between the compressing-rollers, each of which has a pass or circumferential recess similar in cross-section to the cross-section of half the cable flatwise, but smaller, so that the cable will be condensed when passed through these recesses or passes of the rollers.

In Fig. 4 the letters C C indicate the rollers and *c c* the passes or circumferential recesses. The rollers are mounted in suitable bearings in a well-known manner, and geared together by means of suitable toothed wheels, in order that they may both move at the same speed when driven by ordinary connection with a motor. The passes of the rollers are of such dimensions as to somewhat condense the lead and the insulating material of the wires and compress the lead so snugly around the wires as to leave no room for air within the pipe, an air-tight cable being thus secured.

In Fig. 2, which shows a cross-section of the cable after compression, A is the inclosing-pipe, *a* the partition-walls, and B the insulated wires.

This cable possesses all the merits claimed for the cable in my patent before referred to, with the additional advantage that in its manufacture a far less compression of the pipe is necessary. The corrugation of the pipe necessary to force the flat lead walls into contact between the wires is also obviated, as the separating-walls are already complete before the compression.

In another mode of making my cable the mandrels of the pipe-press may be hollow, and the wires may be introduced into the pipe through these mandrels simultaneously with its formation in the press, as wires have been introduced singly and in groups into the bore of a round cable, and either surrounded by a fused insulating material or not, as desired.

The joining or splicing of two sections of my present improved cable may be accomplished in the same manner as described in my patent before referred to, or the splice may be made in the manner illustrated in Fig. 6. In this figure A and A' designate two sections of cable the wires of which have been spliced by twisting two together in the ordinary manner. After the twisting I wrap the bared portion of the splice with cotton thread or cloth or other insulating material, as at $d$, so as not to make the joint too large, and I then interpose between adjacent joints strips of lead $e$, and draw over the pipe ends a coupling-sleeve, $f$, of lead, which had been previously slipped upon one of the pipe-sections ready for use. The sleeve is then compressed between rollers having passes or recesses somewhat larger than those used to compress the cable, and may be finally soldered in place.

Having now described my invention in such manner that it may be used by others, I claim—

An electric cable composed of a series of insulated wires arranged in practically the same plane in a flat lead pipe, and separated by complete lead walls projecting from, extending between, and integral with the opposite walls of said pipe, substantially as described.

In testimony whereof I affix my signature in presence of two witnesses.

PATRICK B. DELANY.

Witnesses:
JOSEPH M. BULGER,
JAS. E. JAMESON.